United States Patent [19]
Hanna

[11] 3,939,516
[45] Feb. 24, 1976

[54] MODULE CAR WASH

[76] Inventor: Daniel C. Hanna, 1133 Rivington Drive, Portland, Oreg. 97201

[22] Filed: Mar. 7, 1975

[21] Appl. No.: 556,317

Related U.S. Application Data

[63] Continuation of Ser. No. 445,214, Feb. 25, 1974, abandoned, which is a continuation of Ser. No. 267,088, June 28, 1972, abandoned.

[52] U.S. Cl. ............................ 15/53 AB; 15/DIG. 2
[51] Int. Cl.² .............................................. B60S 3/06
[58] Field of Search ............ 15/DIG. 2, 21 R, 21 D, 15/21 E, 53 A, 53 AB, 53 B, 53 R, 97

[56] References Cited
UNITED STATES PATENTS

| | | | |
|---|---|---|---|
| 3,037,223 | 6/1962 | Lovsey | 15/DIG. 2 |
| 3,332,098 | 7/1967 | Smith | 15/21 D |
| 3,624,852 | 12/1971 | Hanna | 15/21 D |

*Primary Examiner*—Edward L. Roberts
*Attorney, Agent, or Firm*—Klarquist, Sparkman, Campbell, Leigh, Hall & Whinston

[57] ABSTRACT

A car wash includes a series of modules mounted in an overhead position above the path of cars to be washed. The overhead modules mount brushes, sprays, air nozzles and curtain-like scrubbers so as to keep the ground level clear of this apparatus. The modules also are open to one another to form an air tunnel for drying air to travel to a blower.

7 Claims, 4 Drawing Figures

MODULE CAR WASH

This is a continuation of application Ser. No. 445,214, filed Feb. 25, 1974 and now abandoned which, in turn, is a continuation of application Ser. No. 267,088, filed June 28, 1972, and now abandoned.

DESCRIPTION

This invention relates to an improved module car wash, and more particularly to a car wash in which substantially all cleaning mechanisms thereof are ceiling suspended.

An object of the invention is to provide a new and improved module car wash.

Another object of the invention is to provide a car wash in which substantially all cleaning mechanisms thereof are ceiling suspended.

A further object of the invention is to provide a car wash in which top and wraparound brushing mechanisms, a curtain-like scrubber, sprays and dryer are overhead mounted.

Another object of the invention is to provide a car wash in which a series of equipment mounting, overhead modules form an air tunnel to a blower mounted in one of the modules.

Another object of the invention is to provide a car wash building in which the top portion is formed by a series of compartments secured together, supported in elevated positions, carrying substantially all of the car cleaning devices, and supporting a roof.

Figure 1:
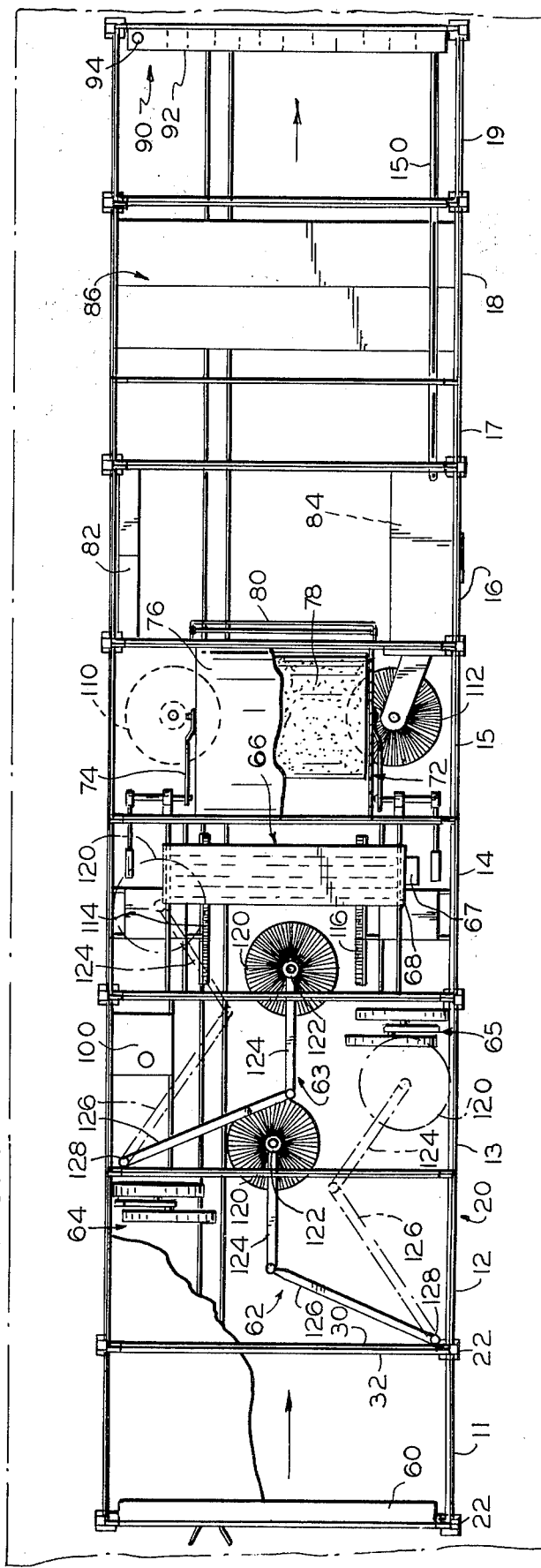
FIG. 1 is a top plan view of an improved module car wash forming one embodiment of the invention with portions thereof broken away.

Referring now in detail to the drawings, there is shown therein an improved module car wash forming one embodiment of the invention and including modules 11-19, of which each, except the module 17, which is a spacer module, is of substantially the same size and has substantially the same skeletal framework. The modules are secured together to form an elongated tunnel or attic 20 and are supported by posts or columns 22 in positions spaced sufficiently above a concrete slab or runway 24 forming a path for cars to be washed that the cars can move freely under the tunnel. The slab 24 may be provided with a conveyor for pushing the cars along the runway and with the usual drains, etc. of a car wash. A roof 26, which, as shown, is a sectional reinforced concrete member, is secured to the top of the tunnel.

The skeletal framework of each of the modules 11-19 includes rectangular end frames 30 and 32 of horizontal channels 33 and 34 and vertical channels 35 and 36. Diagonal channels 37 and top and bottom side channels 38 and 39 are welded together and to the end frames 30 and 32. The channels 35 and 36 of adjacent modules are bolted together to rigidly form the tunnel, and the channels 35 and 36 are bolted or welded to the posts to secure them rigidly thereto. Downwardly directed lights 40 are provided in the tunnel and translucent ceiling panels 42 are secured to the bottom of the tunnel to transmit the light to the area below the tunnel. Side panels 44 are secured to the sides of the modules and to channels 46 welded to the channels 35 and 36. Access doors 48 are provided for installation and maintenance, and personnel can walk the entire length of the tunnel.

Figure 2:
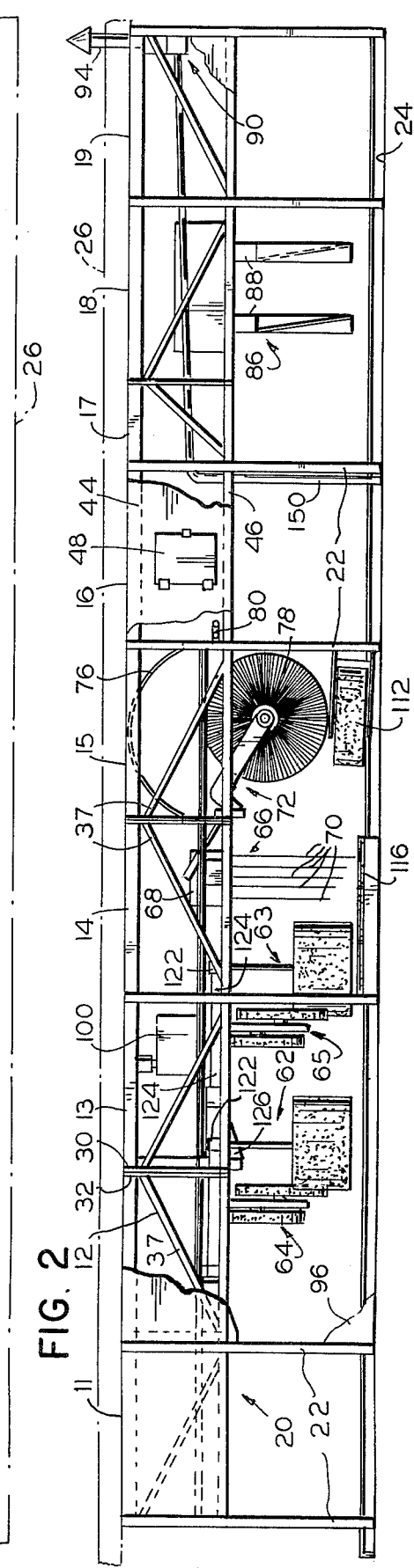
FIG. 2 is a side elevation view of the car wash of FIG. 1.
Figure 3:
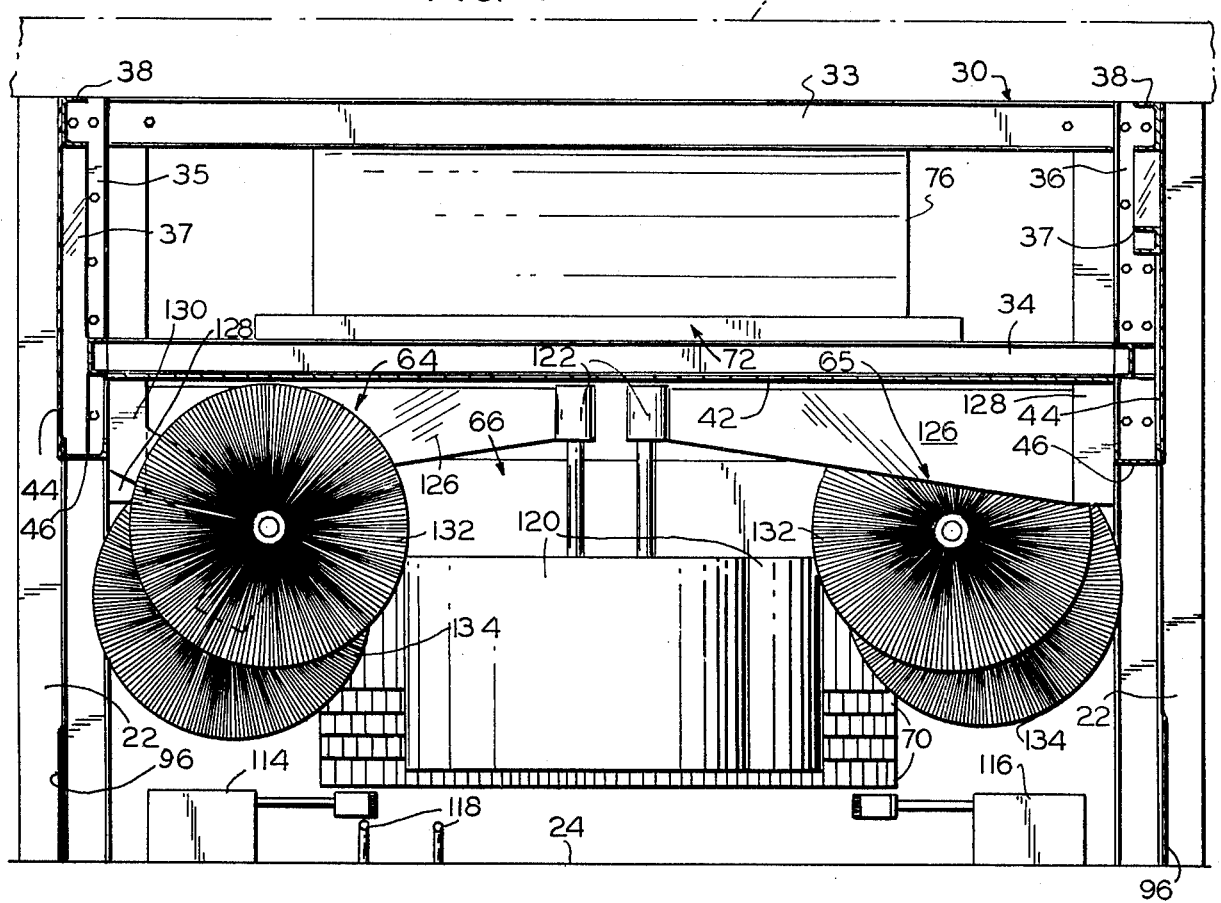
FIG. 3 is an enlarged vertical sectional view of the car wash of FIG. 1.
Figure 4:
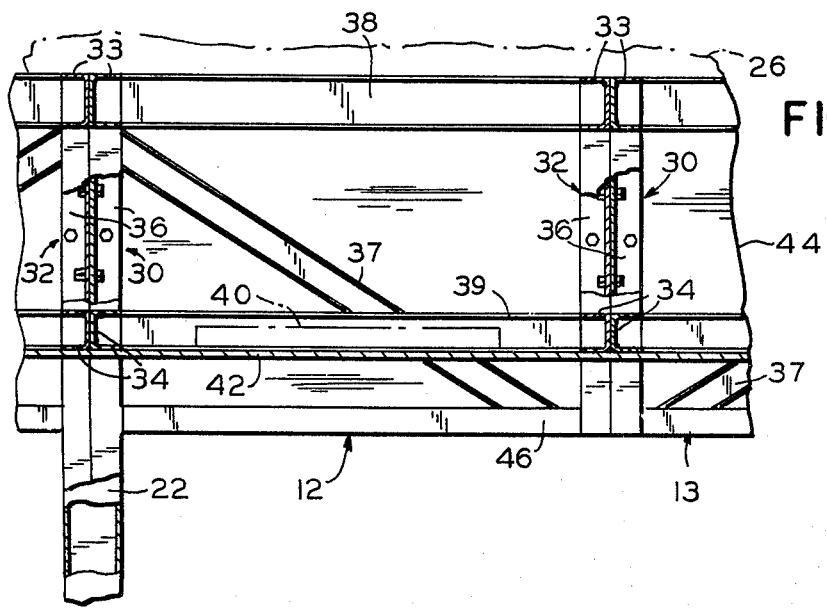
FIG. 4 is an enlarged, fragmentary, partially sectional, side elevation view of a portion of the car wash of FIG. 1.

Cars are advanced by the conveyor from left to right, as viewed in FIGS. 1 and 2, through the car wash. The car travels under the modules 11 to 19. The module 11 contains a hot air blower 60 which blows a curtain of air across the entrance. The modules 12 and 13 suspend wraparound brushing devices 62 and 63 and side window brush devices 64 and 65. A friction scrubber 66 has its drive 67 and suspending frame 68 mounted in the module 14, and slit curtains 70 are suspended from and moved by the frame 68. A counterweighted top brush device 72 has its U-shaped frame 74 pivotally mounted on the module 15 and a partially cylindrical shroud 76 in the module 15 provides clearance for top brush 78 to be moved up into the module 15. The ends of the shroud are spaced from the side walls of the module 15 to provide air passages and personnel passageways through the module 15 from the module 14 to the module 16. A rinsing sprayer 80 is mounted in the module 16 as is a panel 82 of electrical controls. A boiler compartment 84 housing the usual gas or oil burner, boiler, and water pumps is mounted in the pit but may be mounted in one of the modules. An air dryer 86 having a top nozzle portion and side nozzle 88 is mounted by the module 18. A hot air blower 90 mounted in the module 19 draws air through the tunnel from openings at the lefthand end of the module 11, and through a heat exchanger 92 through which hot exhaust gases from the boiler travel to a vent 94. The heated air is blown by the blower 90 downwardly across the exit of the tunnel 20 to form an air door. Side walls 96, which may be transparent or opaque with windows, are secured to the posts 22 to form a tunnel-like path for the cars with the attic 20. A hydraulic pump and reservoir unit 100 is mounted in the module 13 and supplies hydraulic power to the devices 62, 63, 64, 65, 66 and 72 through suitable hydraulic lines (not shown).

If desired, rocker panel brush devices 110 and 112 and wheel washers 114 and 116 may be mounted on the runway 24, which has wheel guiding rails 118 for the left wheels of the cars. The rocker panel brush devices are mounted on the posts 22 at the juncture of the modules 15 and 16.

The wraparound brush devices 62 and 63 have brushes 120 and hydraulic motors 122 mounted on overhead arms 124 pivotally mounted on overhead arms 126 having vertical shaft portions extending up into tubular journaling portions 128 fixed to corner portions of the modules 12 and 13. The wraparound brush devices are of the same general construction and operation as those disclosed and claimed in Hanna U.S. Pat. No. 3,350,733. The side panels extend below the module frames sufficiently to substantially cover the arms 124 and 126 from the side.

The side window brushing devices 64 and 65 have arms 130 pivotally suspended from hinging brackets (not shown) bolted to the side channels 38, and are similar in construction and operation to side window brushing devices disclosed and claimed in Hanna U.S. Pat. No. 3,546,728. The arms 130 are generally S-shaped and mount brushes 132 and 134 in offset positions. The brushes 132 and 134 are driven by hydraulic motors (not shown) supplied with power by hoses (not shown) carried by and extending along arms 130. Preferably, the arms 130 are hollow and the hoses are enclosed within the arms.

An exhaust line 150 from the boiler compartment 84 travels to the heat exchanger unit 92. The several cleaning devices are supplied with soapy water when needed from pumps in the boiler compartment.

The above-described car wash has almost all the cleaning equipment mounted up off the floor, and with the operating mechanisms in dry areas. The drying air is drawn from a dry area also (at the front end of the tunnel 20). Access to the cleaning devices in the tunnel is provided even while cars are being advanced and washed therebelow.

What is claimed is:

1. In a car wash,
   a pathway of a predetermined width along which cars to be washed can be moved,
   an attic-like building structure including a framework and sides,
   post means at the sides of the pathway supporting the building structure in a position raised completely above the height of a car to be moved along the pathway, the sides being open for sight except for the post means,
   a plurality of cleaning mechanisms including an articulated wraparound brush device, a top cleaning device and a window brush device,
   and mounting mechanisms mounting all of said devices and constituting the sole supports for said devices, all of said mounting mechanisms being mounted by said framework above said height and suspending said devices into the path of the cars,
   the overall width of the combined building structure and post means providing a narrow building and the building structure being overhead and mounting the mounting means serving to keep them above the spray area to reduce wear and make maintenance convenient.

2. The car wash of claim 1 wherein the framework means includes a plurality of modules secured together in series extending along the pathway and defining the building structure.

3. The car wash of claim 2 including blower means mounted in one of the modules, the modules defining a tunnel-like air passageway to the blower means,
   and nozzle means supplied with air under pressure from the blower means for blowing air on cars advanced along the pathway.

4. The car wash of claim 3 wherein the blower means is located near one end of the series of modules and the air passageway extends to the other end of the series of modules and has an entrance opening in a vertical wall at said other end.

5. The car wash of claim 1 wherein the framework means comprises an overhead compartment,
   a hydraylic power source mounted in the compartment,
   and hydraulic motor means supplied with power from the source for driving the brushing devices.

6. The car wash of claim 5 including lighting means mounted in the compartment for lighting the pathway.

7. The car wash of claim 1 wherein the framework means includes a plurality of box-like skeletal frames secured in end-to-end relationship to each other.

* * * * *